P. F. RANDOLPH.
DROPPERS FOR FERTILIZERS.
No. 182,385. Patented Sept. 19, 1876.
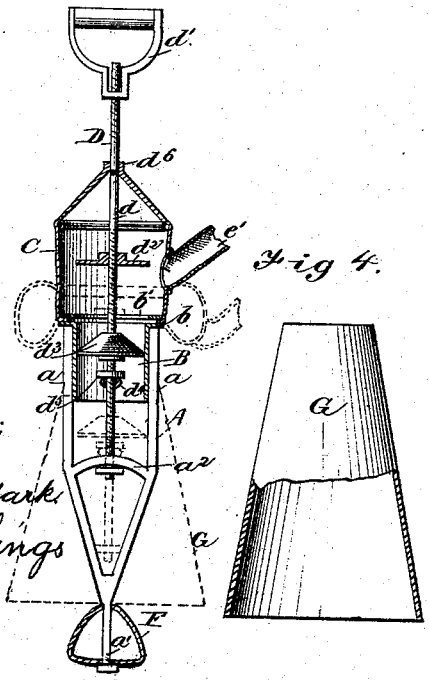
Witnesses:
Harry C. Clark
M. E. Stallings
Inventor
P. F. Randolph
by H. W. Beadle & Co.
his Attys

UNITED STATES PATENT OFFICE.

PETER F. RANDOLPH, OF LIBERTY CORNER, NEW JERSEY.

IMPROVEMENT IN DROPPERS FOR FERTILIZERS.

Specification forming part of Letters Patent No. 182,385, dated September 19, 1876; application filed March 14, 1876.

*To all whom it may concern:*

Be it known that I, PETER F. RANDOLPH, of Liberty Corner, in the county of Somerset and State of New Jersey, have invented a new and useful Improvement in Droppers for Fertilizers, &c.; and I do hereby declare that the following is a full and exact description of the same, reference being had to the accompanying drawings, and to the letters of reference marked thereon.

This invention is designed for dropping fertilizers and analogous substances, such as guano, plaster, phosphates, ashes, &c.; and it consists, mainly, first, in the combination of a plunger having an upper and lower valve, and a barrel or cylinder open at both ends, with a hopper attached to one end of the barrel; second, in the combination of suitable discharging mechanism with a flexible vibrating hopper, adapted, by means of its movement, to prevent the sticking or clogging of its contents; third, in the means employed to adjust the valves, for the purpose of determining the amount delivered at each discharge; and, fourth, in certain details of construction, which, in connection with the foregoing, will be fully described hereinafter.

In the drawings, Figure 1 is a perspective view, representing the manner of carrying and using my invention; Fig. 2, a vertical elevation, partially in section; Fig. 3, an enlarged view of the upper part, and Fig. 4 a detached view of the protecting-skirt.

To enable others skilled in the art to make and use my invention, I will now proceed to describe fully its construction and manner of operation.

A represents the frame of the dropper, consisting of the side bars $a\ a$, terminating at their lower ends in a rod, $a^1$, and united above by the intermediate barrel or cylinder, as shown. $a^2$ represents a transverse bar of semi-oval or semicircular form, uniting the sides of the frame-work, and provided with a central guiding-opening for the lower end of the plunger, which is adapted, by means of its location, to limit the movement of the latter in a downward direction. B represents the barrel or cylinder, secured between the side bars of the frame at their upper ends, which is open at both ends, but is provided above with an outwardly-projecting flange, $b$, as shown. $b'$ represents a clamping-ring, which is secured to the flange by means of screws, as shown. C represents the hopper, consisting essentially of a bottomless sack, secured below to the upper end of the barrel by means of the clamping-ring, and provided above at its upper edge with a distending rod or wire. D represents a plunger, consisting of the stem or shaft $d$, provided above with the adjustable handle $d^1$, as shown. $d^2$ represents the upper valve, provided below with a flat face; and $d^3$, the lower valve, provided above with a conical face, as shown.

The valves, it will be observed, are rendered adjustable upon the shaft by means of screw-threads, so that they may be located at any desired points upon the shaft, and may also be adjusted relatively to each other, for the purpose of determining the amount of fertilizer to be delivered at each discharge.

$d^4$ represents a rubber ball, or its equivalent, located upon the shaft, below the lower valve; and $d^5$ an adjusting-nut, by means of which its vertical position may be determined. $d^6$ represents a ring or casting, located upon the shaft and held from downward movement by means of a supporting pin, but which is free to revolve thereon in either direction, as shown. $d^7$ represents connecting rods or wires, by means of which the ring or casting $d^6$ upon the shaft is attached to the distending-wire of the hopper.

E, Fig. 1, represents a bag provided with a strap, $e$, having a buckle, to permit it to be adjusted for different persons. $e^1$ represents a connecting-chute uniting the lower part of the bag with the vibrating hopper, which is provided with a holding-strap, $e^2$, as shown.

F represents a step, consisting of a block or ball, of any suitable shape, size, or material, which is secured in any proper manner to the lower portion of the frame. I preferably, however, make the lower face flat, or nearly so, in order that the implement may not enter the ground; and the upper surface conical, in order that it may not retain any fertilizer which may chance to fall upon it.

G represents an auxiliary skirt depending from the barrel, which may be employed to prevent the improper scattering of the fertilizer on a windy day. This may be constructed of any suitable size, shape, and material, but is preferably formed of cloth or tin, contracted at the top, as shown. If formed of cloth, its lower edge may be provided with an adjustable distending-wire, for enlarging or diminishing its area, as may be desired.

The operation of the parts is substantially as follows: The bag having been filled with the material to be dropped and properly placed upon the person of the operator, its contents will be gradually delivered through the connecting-chute into the flexible hopper. The hopper being filled, the elevated plunger may be depressed, the implement being supported by its step resting upon the ground, when, consequently, a charge of material, depending in amount upon the distance between the valves, will be carried through the barrel and delivered through its open end below.

The discharging action is facilitated by the conical face of the lower valve, which affords no resting-place for the material, excepting when within the barrel, and also by the shock which is imparted to the plunger by the contact of its rubber ball with the transverse stop-bar, as shown in dotted lines, Fig. 2. As the plunger descends, the upper edge of the flexible hopper descends, of course, with it, and the sack assumes the form shown in dotted lines, Fig. 2. When, however, the plunger rises again, the hopper, of course, is distended again, and its contents are necessarily thrown toward the center between the valves. This action tends, therefore, to deliver the material into the space between the valves, and also violently agitates the same, so that sticking or clogging is impossible.

Some of the advantages of the described construction are as follows: The implement, by means of its adjustable handle and strap, is adapted for men of different sizes. The valves are readily adjusted to discharge the material in uniform quantities of any desired amount. By the employment of the flexible hopper its contents are so violently agitated that clogging or sticking is impossible. By arresting the motion of the plunger the material is discharged with sufficient force to properly scatter the same. By the employment of the ball-step below, the implement is prevented from entering the earth. This step also is adapted to throw off any fertilizer which may fall upon it. By means of the skirt it is possible to sow with as great uniformity in windy weather as in still.

Having thus fully described my invention, what I claim as new, and desire to secure by Letters Patent, is—

1. The combination of a plunger or valve-stem, having an upper and lower valve and a barrel or cylinder open at both ends, with a hopper attached to one end of the barrel, as described.

2. In combination with the plunger, the upper and lower valves, and the means for adjusting them, substantially as described.

3. In combination with the plunger and cylinder, the conical valve, substantially as described.

4. In combination with the plunger, the rubber ball and stop-bar for arresting its movement, as described.

5. The combination of the bag and connecting-chute with the plunger and vibrating hopper.

6. In a dropper for fertilizers, the combination of a barrel or cylinder, open at both ends, a plunger provided with measuring-valves and a flexible hopper adapted to vibrate as described.

7. In a dropper for fertilizers, the combination of a barrel or cylinder open at both ends, a plunger provided with measuring-valves, and a stop to arrest the motion of the plunger, as described.

8. In a dropper for fertilizers, the combination of a fixed portion adapted to rest upon the earth, having a barrel or cylinder open at both ends, a vibrating plunger having measuring-valves, and a flexible hopper vibrating with the plunger, as described.

This specification signed and witnessed this 28th day of February, 1876.

PETER F. RANDOLPH.

Witnesses:
- T. W. FRECH,
- JAMES MILLER, Jr.